United States Patent [19]

Fritz et al.

[11] 4,076,901
[45] Feb. 28, 1978

[54] HIGH-TEMPERATURE METHOD OF OPERATING A LEAD-ACID CELL

[75] Inventors: Heinz Peter Fritz, Garching near Munich; Jürgen Besenhardt, Neu-Sass; Gerhard Rauschenbach, Essen, all of Germany

[73] Assignee: Rheinisch-Westfälisches Elektrizitätswerk AG, Essen, Germany

[21] Appl. No.: 733,702

[22] Filed: Oct. 19, 1976

[30] Foreign Application Priority Data

Oct. 20, 1975  Germany ............................. 2546972

[51] Int. Cl.$^2$ ........................................... H01M 10/44
[52] U.S. Cl. ...................................... 429/50; 429/126; 429/136; 429/225
[58] Field of Search ................ 429/50, 126, 225–228, 429/136–139

[56] References Cited

U.S. PATENT DOCUMENTS

| | | | |
|---|---|---|---|
| 2,803,690 | 8/1957 | Stevens | 429/126 |
| 3,515,592 | 6/1970 | Nishimura | 429/126 X |
| 3,589,940 | 6/1971 | Bridge et al. | 429/126 X |
| 3,711,332 | 1/1973 | Bastacky | 429/225 X |
| 3,765,942 | 10/1973 | Jache | 429/225 X |

*Primary Examiner*—Charles F. LeFevour
*Attorney, Agent, or Firm*—Karl F. Ross

[57] ABSTRACT

A lead-acid storage cell is operated at a temperature of about 70° C and comprises a positive electrode which, in the charged state, carries an active mass consisting predominantly of lead dioxide, a negative electrode consisting predominantly of lead in the charged condition, and a sulfuric acid electrolyte. To permit the storage cell to operate at the elevated temperature without deterioration, the negative electrode is provided with a sheath permeable to the electrolyte but impermeable to particles released from the negative electrode. The sheath, which may constitute the interelectrode separator, can consist of a nonwoven or woven fabric of glass fiber or a nonwoven or woven fabric of unsubstituted or perhalogenated polyolefin or a layer of ceramic. The electrolyte in the cell is covered by a vaporization-resistant layer consisting of floating solid particles or a liquid which is unaffected by the high operating temperature. The battery or cell can be heated so as to permit its discharge, for example, at the aforementioned optimum temperature of about 70° C.

10 Claims, 2 Drawing Figures

HIGH-TEMPERATURE METHOD OF OPERATING A LEAD-ACID CELL

FIELD OF THE INVENTION

The present invention relates to lead-acid cells and batteries and, more particularly, to a lead-acid cell and a method of operating same so as to obtain increased energy density and increased power density.

BACKGROUND OF THE INVENTION

A conventional lead-acid cell comprises, in a battery housing-forming vessel for a liquid electrolyte, especially sulfuric acid, a positive electrode whose active mass consists predominantly of lead dioxide in a charged state and a negative electrode whose active mass consists predominantly of lead in the charged state.

The literature makes it clear, as does experience, that such lead-acid cells, also termed lead accumulators, should not be operated at temperatures above about 50° C except for brief intervals. At higher temperatures, the power output and the useful (recycling) life of the cell both diminish.

In practice it has been found, with such conventional cells, that the electrode tend to deteriorate at elevated temperatures by the separation of active material therefrom and that there is an increased oxidation of the separators and loss of water from the battery by increased vaporization. The latter results in an increased concentration of the acid of the electrolyte.

This effect is so well known that high-energy, large lead-acid accumulators of the type used to drive motor buses, for example, are provided with expensive weight-increasing and energy-consuming cooling systems to abstract or dissipate the Joule heat developed in the battery during operation thereof.

OBJECTS OF THE INVENTION

It is the principal object of the present invention to provide a method of operating a lead-acid accumulator whereby the aforementioned disadvantages are obviated and high energy density, high power density and a high power output per unit volume of the battery or cell can be obtained.

Another object of the invention is to provide an improved lead-acid storage cell capable of being operated at elevated temperatures.

SUMMARY OF THE INVENTION

The invention is based upon our surprising discovery, in view of the literature and experiences of others in this field, of a system for operating a lead-acid storage cell which comprises discharging the same under load at shaply increased temperaures of, say, 70° C and, more generally, operating the lead-acid storage cell at such elevated temperatures. We have found, more particularly, that a lead-acid cell can be specially constructed to be capable of withstanding such high temperatures without the aforementioned disadvantages to yield considerable advantages, namely, a high energy density (in terms of watt-hours per kilogram or Wh/gm), a high power density (in terms of watts per kilogram or W/kg) and a high power volume (in terms of watts per cubic decimeter or $W/dm^3$).

It appears that the increased energy density and power density are a result of an increase in material transport within the cell, resulting in more rapid elimination of concentration gradients, polarization and the like. More specifically, we have found that the higher operating temperature allows more effective access of the electrolyte to the active mass and thus a more efficient liquid/solid heterophase reaction during both charging and discharging.

It appears that the increased operating temperature results in a substantial reduction in the viscosity of the electrolyte such that, for example, in the increase of the operating temperaure from 20° to 70° C, the viscosity of a standard sulfuric acid electrolyte with a specific gravity of about 1.25 is reduced threefold, i.e. to a third of its original viscosity. As a result the concentration gradients within the electrolyte and at the liquid/solid phase boundary are more rapidly dissipated and various concentration effects resulting during charging and discharging are nullified.

Specifically, during the discharging of the cell, the normal tendency to deplete the electrolyte at both electrodes and within the pores to which the electrolyte has only limited access is more readily and rapidly equalized with increasing operation temperatures and furthermore that the concentration gradient across any portion of the cell or within the electrodes is reduced or eliminated.

With lead-acid accumulators of conventional construction, in which sulfuric acid is the electrolyte, during the current-supply reaction, the concentration of the electrolyte at the surface of the electrode, which determines the electromotive force, is reduced and hence with decreasing concentration the electromotive force (E.M.F.) is less. Thus, if one discharges such a lead-acid storage cell, for example at constant current to a given terminal voltage, the concentration drop of the electrolyte in the pores of the electrode is greater at lower temperatures and hence the E.M.F. is less so that the terminal voltage is reached earlier than is the case when higher temperatures are employed. Thus not only the Watt-hour (Wh) efficiency but also the Ampere-hour (Ah) efficiency of the storage cell is reduced.

The above-described effect is intensified in that the ohmic voltage drop within the electrode at lower operating temperatures is greater than at higher operating temperatures so that the potential drop within the pores of the active mass is greater and the internal resistance of the entire battery or cell is increased. The increased potential drop results in a concentration of the current-supply reaction only at the edges of the pores in the interior of the electrode so that the active mass in the depths of the pores within the active electrode is only limitedly a participant in the current-supply reaction.

Finally, with increasing operating temperatures there is a noticeable increase in the concentration of lead(II) ions ($Pb^{++}$ ions) form as an intermediate stage at the anodic and cathodic reactions. The increase in $Pb^{++}$ ion concentrations in the electrolyte has been found to give rise to an increased power density of the lead-acid accumulator when the latter is discharging under load.

The above-described improvement, obtained with a lead-acid storage cell during discharge, also applies during charging.

An increased operating temperature of the lead-acid accumulator has thus been found to affect both the charging and discharging operations of the battery in a manner similar to that which obtains when lower discharging and charging current densities are employed. These effects are evidenced by a reduction in the polarization-related voltage drops, better utilization of the active masses of both electrodes and like phenomena.

Previous investigations into the theory and operation of lead-acid storage cells and especially the cycling thereof at elevated temperatures, have taught that high temperatures signify a reduction in charging time and involve significant deterioration of the electrodes. For all practical purposes, the art has limited cycling of lead-acid cells to operating temperatures up to about 40° C. Higher operating temperatures are studiously avoided to prevent the aforementioned deterioration of the electrodes, the oxidation of the separators by lead dioxide, and the loss of liquid from the electrolyte.

In fact, these investigations have suggested that even operations at room temperatures to 40° C are unsatisfactory because these temperatures limit the usable charging current.

When a lead-acid accumulator according to the prior art is discharged at a constant current of 1.25 Amperes ($K_{1.25}$), with a lead-acid accumulator having a capacity of 12 A/h after a charging process at 9 A/h, the efficiency of the negative electrode is still 99.9% while the positive electrode falls to 81.6% efficiency (cf. W. H. Durant, A. I. Harrison and K. Peters, 6, International Power Sources Symposium, Brighton, Great Britain, 1968, Abstract, page 1).

Similarly, attempts have been made to operate lead-acid accumulators at temperatures of around 55° C (cf. W. P. Garten, "Bleiakkumulatoren", VARTA -Fachbuchreihe, Band 1, 1975, page 58) and at temperatures of about 43° C (cf. G. W. Vinal, "Storage Batteries", Fourth Volume, J. Wiley & Sons, Inc., New York, 1955, page 311) with the conclusion that such temperatures should never be used and are undesirable. At best, these temperatures were found by the cited researchers to be limiting temperatures for practical operation of lead-acid storage batteries.

It is, therefore, indeed surprising that we have found that, with operating temperatures well above these limits, i.e. an operating temperature above 55° C and of about 70° C, optimum energy density and power density can be obtained without deterioration of the lead-acid storage cell, provided that the lead-acid storage cell is constructed in a unique manner.

It has been found, even more surprisingly, that with charge-discharge cycling of lead-acid accumulators at operating temperatures of about 70° C, the limiting effects are not a result of the current capacity of the positive electrode, but rather, the chemical and mechanical stability of the negative electrode which appears to provide the practical limits to use of the higher temperature. The chemical and mechanical stability of the positive electrode, which is a significant problem at low operating temperatures, for example at room temperature, no longer is seen to be a problem. It appears that the oxygen evolution which is so pronounced during the charging of the positive electrode is significantly reduced with increasing operating temperature using, as an electrolyte, sulfuric acid or another acid capable of forming low-solubility lead salts. As a result, the efficiency of the positive electrode is significantly improved over the efficiency of the same electrode at the lower temperature and the useful life of the positive electrode is sharply increased. It appears that the positive electrode no longer is characterized by a loss of the active mass because of the generation of oxygen during the charging process.

The unique construction of the lead-acid cell or accumulator, according to the invention, is characterized by providing for the negative electrode a sheath which is, on the one hand, permeable to the electrolyte and, on the other hand, impenetrable by particles which are shed by the negative electrode. Preferably the sheath should consist of a material inert to all of the components of the lead-acid storage cell.

Most advantageously, the sheath of the negative electrode can be formed by a woven fabric or mat (nonwoven fabric) of glass fibers which may be impregnated for stability, e.g. with a polyester, or a fabric or mat (nonwoven fabric) of perhalogenated polyolefins or unsubstituted polyolefins, or of ceramic material. In the case in which the lead-acid storage cell is a so-called packed cell, the sheath can constitute the separator between the positive and negative electrodes. It is also possible, of course, to provide the customary cellulosic separator between the sheathed negative electrodes and the unsheathed positive electrodes.

According to another feature of the invention, the tendency of water to be evaporated from the liquid electrolyte is reduced by covering the liquid electrolyte of the cell or accumulator with a layer of material which is stable at the operating temperature and can be a pulverulent or other finely divided solid or liquid, the covering material having a specific gravity which is less than the specific gravity of the electrolyte.

Best results have been obtained with liquid vaporization-limiting layers which are nonmiscible with and insoluble in the electrolyte and indeed which are not wetted by the electrolyte. Such liquids are hydrophobic materials, for example, paraffin oils or other mixtures of saturated hydrocarbons.

When reference is made herein to a temperature of about 70° C, it will be understood that 70° ± 1° C is the preferred operating temperature but that the temperaure can vary in either direction within about 5° C. Thus an operating temperature range of 65° - 75° C is practical and even some higher temperatures can be used from time to time. In all cases, however, the layer of covering material should have a boiling point substantially above the operating temperature.

To ensure operation and especially discharging of the cell at the elevated temperature, we prefer to provide a heating means immersed in the electrolyte, e.g. an immersion heater, which may be connected across the cell or battery and which can be provided with a temperature control responsive to the temperature of the electrolyte. The thermostat or other temperature control may be an on/off bimetallic switch which cuts in when the temperature falls below, say 65° C, and turns the heater off when the temperature exceeds, say, 75° C. The thermostat also may be constructed to maintain a constant temperature of 70° C. The heater, however, can be connected in charging and discharging circuits so that when the battery is disconnected from either a charging ot discharging circuit, the heater is likewise disconnected and the temperature of the battery can fall to, say, room temperature.

By way of example, when a lead-acid accumulator according to the present invention is operated at a temperature of 70° C, there is a sharp increase in energy density and power density by comparison to the operation of the same lead-acid storage cell at a temperature of, say, 25° C. Firstly, there is an increased current density and increased A/h capacity so that the discharge time may remain the same although a higher current density is drawing from the cell. Of course, if the discharge time is increased when operating at the higher temperature, a lower current density may be used, to obtain the higher A/h capacity.

Cycling was carried out with a charging terminal voltage of 2.35 Volts and a discharging final terminal voltage of 1.4 Volts. The charging and discharging current densities were 12 mA/cm$^2$, corresponding to I$_4$ at 25° C. The resulting increase in capacity was about 50%. The A/h efficiency loss was only about 10% and, of course, does not affect the overall advantages of the improved system since it means only that additional current must be provided by the charging during charging of the cell. Furthermore, when the cell operated at 75° C was compared to the same cell operated at 25° C, polarization-related voltage drops during charging and discharging were found to be reduced by half. The relative capacity gain by operation at 70° C over operations at 25° C with a K$_{0.6}$ discharge was found to be several hundred percent. This is highly significant for lead-acid storage cells used for motor vehicle propulsion since it means that high energy drains over longer periods than can be obtained by conventional operation are available.

Corrosion of the lead-acid material of the negative electrode does not pose a problem in the system of the present invention since lead, at temperatures below 85° C, is hardly attacked by sulfuric acid (see "Gmelins Handbuch der anorganischen Chemie," 8 Auflage, "Blei," Teil B 1, Verlag Chemie, Weinheim, 1972, page 345). The lead dioxide of the positive electrode is practically inert even at higher temperatures with respect to the electrolyte.

BRIEF DESCRIPTION OF THE DRAWING

The above and other objects, features and advantages of the present invention will become more readily apparent from the following description, reference being made to the accompanying drawing in which.

SPECIFIC DESCRIPTION

Figure 1:
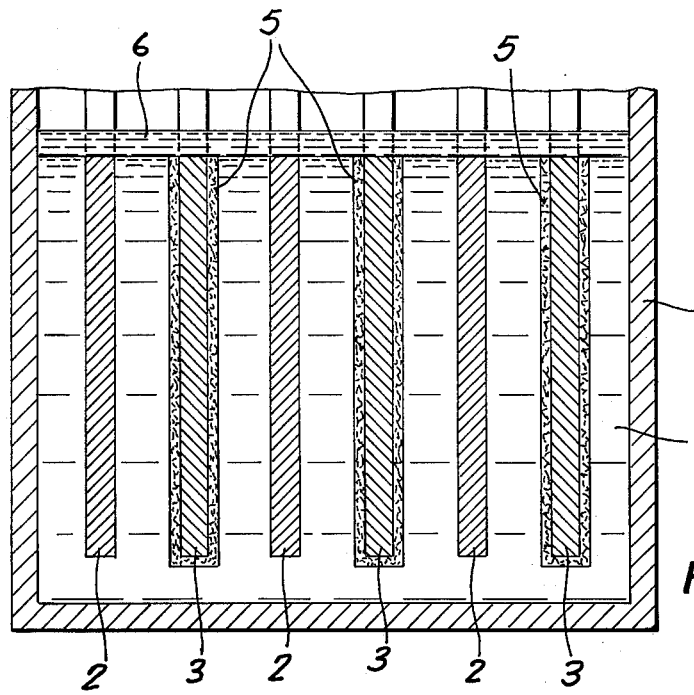
FIG. 1 is a diagrammatic vertical section through a lead-acid accumulator embodying the principles of the present invention.

FIG. 1 shows schematically a battery in accordance with the invention, the battery comprising a conventional battery housing 1 containing an aqueous sulfuric acid electrolyte 4 and receiving a plurality of positive electrodes 2 whose active masses predominantly consist of lead oxide in the charged condition of the battery. Between each pair of positive electrodes or flanking same there are provided negative electrodes 3 whose active mass consists predominantly of elemental lead in the charged condition of the battery.

According to the invention, the negative electrodes 3 are each provided with a sheath 5 of an electrolyte-permeable substance which is inert to the electrolyte 4 and to the other components of the battery. The sheath, however, is impermeable by particles which may slough off or be released from the negative electrode 3. Advantageously, this sheath consists of a woven fabric or a nonwoven mat. It may be composed of glass fibers which can be impregnated with, for example, an epoxy to maintain the stability of the glass fibers, or of perhalogenated polyolefins, for example, perchloro-substituted polyolefins, or unsubstituted polyolefins. The sheath may also consist of a permeable ceramic material, e.g. silicon dioxide.

As can be seen from FIG. 1, moreover, the body of liquid electrolyte 4 is overlain by an inert low-volatility layer 6 whose specific gravity is less than that of the electrolyte, which is nonmiscible therewith and which is not wetted by the electrolyte. Preferably the layer 6 consists of paraffin oil, a mixture of saturated hydrocarbons. The electrodes are, of course, connected together and to respective terminals in accordance with the usual practice. The layer 6 prevents evaporation of water from the electrolyte even at high operating temperatures of the battery.

Figure 2:
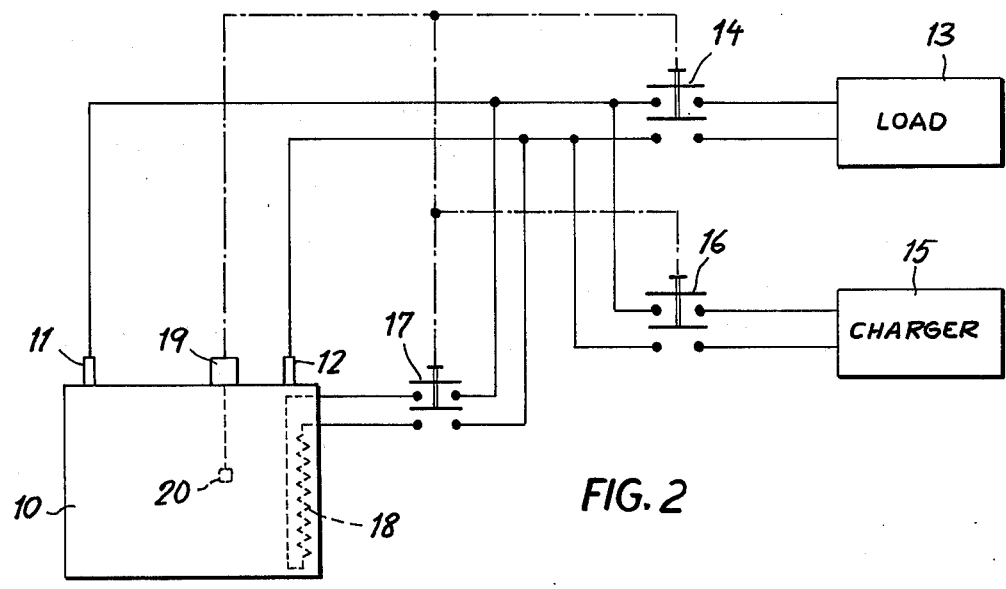
FIG. 2 is a circuit diagram illustrating an aspect of the invention.

In FIG. 2 we have shown an arrangement wherein the battery of FIG. 1, represented at 10 and having the usual terminals 11 and 12, can be connected to a load 13 through a switch 14. The load may, for example, be the traction wheels of a motor vehicle. Alternatively, the battery may be connected to a charger 15 through a switch 16. When either the switch 14 or the switch 16 is operated, a switch 17 is closed to connect a heating element 18 across the terminals 11, 12 to raise the temperature of the electrolyte within the battery 10. A thermostatic control 19 can be provided upon the battery with a sensor 20 immersed in the electrolyte to open the switch 17 when the temperature within the battery exceeds, say 75° C.

SPECIFIC EXAMPLE

A lead-acid cell of the type shown in FIG. 1 using dilute sulfuric acid as an electrolyte with a specific gravity $d15°$ C = 1.3 has its negative electrodes provided with fiber glass mats of electrolyte permeability. A 1 mm thick layer 6 of paraffin oil is provided on the electrolyte and the operating temperature is maintained at 70° C. With K$_4$ discharging, the capacity is about 50% higher and the voltage drop within the battery is about 50% lower than with operation of the same unit at a temperature of 25° C. When the battery was operated without the layer of paraffin oil and without the coating of the negative electrodes with the aforementioned sheath, the battery was incapable of long-term recycling because of loss of water from the electrolyte and loss of material from the negative electrode. With K$_{0.6}$ discharge, the relative increase in capacity was several hundred percent over operation of the same battery at 25° C.

We claim:

1. In a method of operating a lead-acid cell comprising a housing, at least one positive electrode having a lead dioxide active mass in the charged state of the positive electrode and disposed within said housing, a negative electrode consisting predominantly of lead disposed in said housing, and a sulfuric acid electrolyte in said housing in contact with said electrodes, the improvement which comprises:

enveloping said negative electrode in a sheath of a material inert to said electrolyte but permeably thereby and capable of retaining particles of the negative electrode, said sheath being selected from the group which consists of a woven fabric or nonwoven mat of glass fiber, a woven fabric or nonwoven mat of perhalogenated polyolefin, a woven fabric or nonwoven mat of unsubstituted polyolefin, or a ceramic material;

cycling said cell through alternate charge and discharge periods with at least the discharging thereof being effected at a temperature above 55° C; and maintaining a layer of a vaporization-resistant low-volatility material having a specific gravity less than that of said electrolyte and insoluble therein above the electrolyte in said housing.

2. The improvement defined in claim 1 wherein said cell is discharged at a temperature between 65° and 75° C.

3. The improvement defined in claim 2 wherein said cell is discharged at a temperature of about 70° C.

4. The improvement defined in claim 1 wherein said layer consists of solid particles nonwettable by said electrolyte.

5. The improvement defined in claim 1 wherein said layer consists of a hydrophobic organic substance.

6. The improvement defined in claim 5 wherein said hydrophobic organic substance is paraffin oil.

7. A lead-acid storage cell comprising:
a housing forming a receptacle;
a sulfuric acid electrolyte in said receptacle;
at least one positive electrode immersed in said electrolyte and having as an active mass lead dioxide in a charged state of said positive electrode;
a negative electrode in said electrolyte juxtaposed with said positive electrode and having in a charged state of said negative electrode an active mass consisting predominantly of lead;
a sheath of a material permeable to said electrolyte but substantially impenetrable to particles of said negative electrode, said sheath enveloping said negative electrode, said sheath being selected from the group which consists of a woven fabric or nonwoven mat of glass fiber, a woven fabric or nonwoven mat of perhalogenated polyolefin, a woven fabric or nonwoven mat of unsubstituted polyolefin, or a ceramic material;
a layer of low-volatility material overlying said electrolyte in said receptacle and
means for automatically operating said cell at least during the discharge thereof at a temperature between substantially 65° and 75° C.

8. The lead-acid cell defined in claim 7 wherein said layer is composed of solid particles having a specific gravity less than that of the electrolyte and nonwettable thereby.

9. The lead-acid cell defined in claim 7 wherein said layer consists of a liquid having a specific gravity less than that of the electrolyte.

10. The lead-acid cell defined in claim 9 wherein said liquid is paraffin oil.

* * * * *